(12) United States Patent
Miyazaki

(10) Patent No.: US 10,379,689 B2
(45) Date of Patent: Aug. 13, 2019

(54) TOUCH PANEL INCLUDING AN INSULATING SUBSTRATE AND DISPLAY DEVICE FOR THE SAME

(71) Applicant: SHARP KABUSHIKI KAISHA, Sakai, Osaka (JP)

(72) Inventor: Shinichi Miyazaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/739,098

(22) PCT Filed: Jun. 23, 2016

(86) PCT No.: PCT/JP2016/068614
§ 371 (c)(1),
(2) Date: Dec. 21, 2017

(87) PCT Pub. No.: WO2016/208660
PCT Pub. Date: Dec. 29, 2016

(65) Prior Publication Data
US 2018/0173340 A1    Jun. 21, 2018

(30) Foreign Application Priority Data

Jun. 24, 2015  (JP) ................................. 2015-126868

(51) Int. Cl.
*G06F 3/044* (2006.01)
*G02F 1/1333* (2006.01)
*G02F 1/1343* (2006.01)

(52) U.S. Cl.
CPC .......... *G06F 3/044* (2013.01); *G02F 1/13338* (2013.01); *G02F 1/134336* (2013.01);
(Continued)

(58) Field of Classification Search
CPC combination set(s) only.
See application file for complete search history.

(56) References Cited

U.S. PATENT DOCUMENTS

| 2006/0097991 A1* | 5/2006 | Hotelling | G06F 3/044 |
| | | | 345/173 |
| 2012/0062511 A1* | 3/2012 | Ishizaki | G06F 3/044 |
| | | | 345/174 |

(Continued)

FOREIGN PATENT DOCUMENTS

| JP | 2014-130537 A | 7/2014 |
| JP | 2014-199606 A | 10/2014 |

*Primary Examiner* — Temesghen Ghebretinsae
*Assistant Examiner* — Ivelisse Martinez Quiles
(74) *Attorney, Agent, or Firm* — ScienBiziP, P.C.

(57) ABSTRACT

A touch panel includes an insulating substrate; a plurality of touch drive electrodes $61_{Xn+1}$, $61_{Xn}$, and $61_{Xn-1}$ arranged on the insulating substrate so as to be arrayed in a first direction, each of the touch drive electrodes extending in a second direction that intersects with the first direction; touch detection electrodes arranged on the insulating substrate so as to be arrayed in the second direction, each of the touch detection electrodes extending in the first direction; and a dummy electrode 63 that is arranged between adjacent ones of the touch detection electrodes, in which a slit extending substantially in the first direction is provided. The dummy electrode 63 is segmented by the slit into a plurality of electrode portions 631 arrayed in the second direction, and two adjacent ones of the electrode portions 631 with the slit being interposed therebetween are divided at positions different in the first direction.

13 Claims, 20 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | | |
|---|---|---|---|
| 2012/0098782 A1* | 4/2012 | Nam ........................ | G06F 3/044 345/174 |
| 2012/0268418 A1* | 10/2012 | Ishizaki .............. | G02F 1/13338 345/174 |
| 2013/0222297 A1* | 8/2013 | Adachi ................... | G06F 3/041 345/173 |
| 2014/0184560 A1 | 7/2014 | Adachi | |
| 2014/0292713 A1* | 10/2014 | Koito .................. | G02F 1/13338 345/174 |
| 2014/0293159 A1* | 10/2014 | Adachi ................... | G06F 3/044 349/12 |
| 2014/0320760 A1* | 10/2014 | Ishizaki ................. | G06F 3/044 349/12 |
| 2015/0109248 A1* | 4/2015 | Tokai ...................... | G06F 3/044 345/174 |
| 2015/0206501 A1* | 7/2015 | Kurasawa ............... | G06F 3/044 345/206 |
| 2015/0227228 A1* | 8/2015 | Ishizaki ................ | G06F 3/0412 345/174 |
| 2015/0309636 A1* | 10/2015 | Kurasawa ............... | G06F 3/044 345/173 |
| 2015/0331527 A1* | 11/2015 | Ishizaki .............. | G02F 1/13338 345/174 |
| 2016/0041659 A1* | 2/2016 | Chen ....................... | G06F 3/044 345/174 |
| 2017/0060305 A1* | 3/2017 | Adachi ................... | G06F 3/041 |
| 2018/0120986 A1* | 5/2018 | Miyazaki ................ | G06F 3/044 |

* cited by examiner

|  | Reference | Fig. 14 | Fig. 13 | Fig. 12 | Fig. 11 |
|---|---|---|---|---|---|
| Protrusion ratio | 0.0% | 4.6% | 9.3% | 12.5% | 37.5% |
| Output signal ratio (actual value) | 100.0% | 100.0% | 100.0% | 90.5% | 70.0% |
| Output signal ratio (predicted value) | 100.0% | 95.4% | 90.7% | 87.5% | 62.5% |

|  | Reference | Fig. 14 | Fig. 13 | Fig. 12 | Fig. 11 |
|---|---|---|---|---|---|
| Protrusion ratio | 0.0% | 4.6% | 9.3% | 12.5% | 37.5% |
| Detection error | 0.58 | 0.580 | 0.580 | 0.593 | 0.809 |

TOUCH PANEL INCLUDING AN INSULATING SUBSTRATE AND DISPLAY DEVICE FOR THE SAME

TECHNICAL FIELD

The present invention relates to a touch panel and a display device.

BACKGROUND ART

Patent Document 1 discloses a touch sensor-equipped display device that includes touch drive electrodes and touch detection electrodes. In this touch sensor-equipped display device, touch drive electrodes extend in a direction parallel to a direction in which scanning signal lines for driving pixel electrodes extend, and the touch detection electrodes extend in a direction vertical to the direction in which scanning signal lines extend. Further, between adjacent ones of the touch detection electrodes, dummy electrodes are provided so that the touch detection electrodes become unnoticeable to the human eyes.

Here, in a case where the dummy electrode is provided across a plurality of the touch drive electrodes, there is a possibility that signals supplied to the touch drive electrodes could mix via the dummy electrode. The dummy electrode, therefore, is divided at least not to be provided across a plurality of the touch drive electrodes.

PRIOR ART DOCUMENT

Patent Document

Patent Document 1: JP-A-2014-130537

SUMMARY OF THE INVENTION

Problem to be Solved by the Invention

However, if the dummy electrodes are divided by continuous straight lines parallel to the direction in which the touch drive electrodes extend, there is a possibility that during a period while the power source of the display device is OFF, or during a period while a dark image such as a black image is displayed, the dividing lines of the dummy electrodes can be visually recognized under a light source of approximately parallel light such as the sun light of the like.

It is an object of the present invention to provide a touch panel in which dividing lines of the dummy electrodes are hardly visually recognized, and a touch panel-equipped display device in which dividing lines of the dummy electrodes are hardly visually recognized.

Means to Solve the Problem

A touch panel in one embodiment of the present invention includes: an insulating substrate; a plurality of touch drive electrodes arranged on the insulating substrate so as to be arrayed in a first direction, each of the touch drive electrodes extending in a second direction that intersects with the first direction; a plurality of touch detection electrodes arranged on the insulating substrate so as to be arrayed in the second direction, each of the touch detection electrodes extending in the first direction; and a dummy electrode that is arranged between adjacent ones of the touch detection electrodes, in which a slit extending substantially in the first direction is provided, wherein the dummy electrode is segmented by the slit into a plurality of electrode portions arrayed in the second direction, and two adjacent ones of the electrode portions with the slit being interposed therebetween are divided at positions different in the first direction.

Effect of the Invention

According to the disclosure of the present Invention, adjacent ones of the electrode portions of the dummy electrode with the slit being interposed therebetween are divided at positions different in the first direction. This makes the dividing lines hardly visually recognizable, during a period while the power source of the display device is OFF, or during a period while a dark image such as a black image is displayed.

MODE FOR CARRYING OUT THE INVENTION

Figure 1:
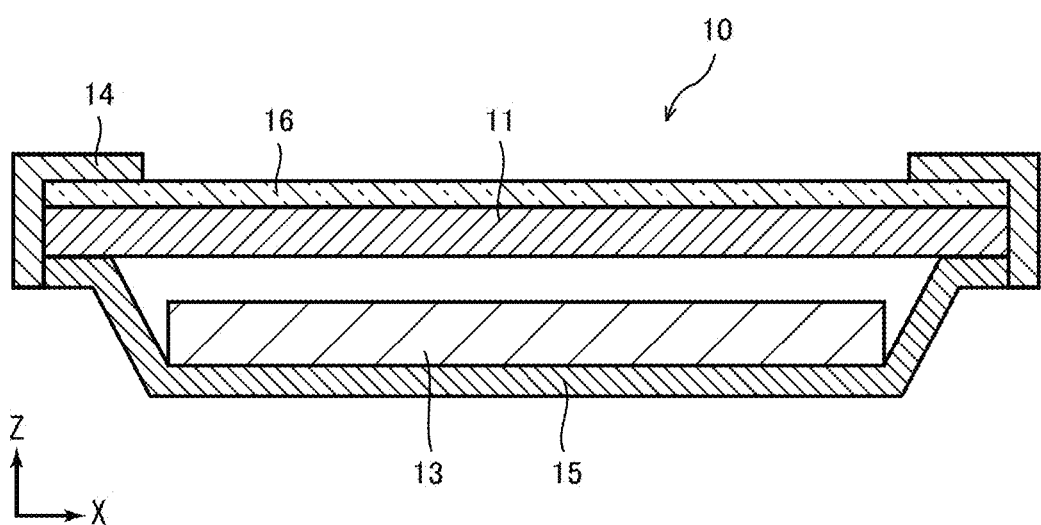
FIG. 1 illustrates a cross-sectional configuration of a touch panel-equipped display device in one embodiment.

A touch panel in one embodiment of the present invention includes: an insulating substrate; a plurality of touch drive electrodes arranged on the insulating substrate so as to be arrayed in a first direction, each of the touch drive electrodes extending in a second direction that intersects with the first direction; a plurality of touch detection electrodes arranged on the insulating substrate so as to be arrayed in the second direction, each of the touch detection electrodes extending in the first direction; and a dummy electrode that is arranged between adjacent ones of the touch detection electrodes, in which a slit extending substantially in the first direction is provided, wherein the dummy electrode is segmented by the slit into a plurality of electrode portions arrayed in the second direction, and two adjacent ones of the electrode portions of the dummy electrode with the slit being interposed therebetween are divided at positions different in the first direction (the first configuration).

According to the first configuration, adjacent ones of the electrode portions of the dummy electrode with the slit being interposed therebetween are divided at positions different in the first direction. The dividing lines that divide the dummy electrodes, therefore, are not continuous straight lines. This makes the dividing lines hardly visually recognizable, during a period while the power source of the display device is OFF, or during a period while a dark image such as a black image is displayed.

The first configuration can be such that the electrode portion is divided into pieces that have a length smaller than a width in the first direction of the touch drive electrode (the second configuration).

According to the second configuration, the dividing lines increase in number and are dispersed, as compared with a configuration where the electrode portions of the dummy electrode have a length equal to the width in the first direction of the touch drive electrodes. This makes the dividing lines hardly visually recognizable.

The first or second configuration can be such that a protrusion ratio, as a ratio at which the dummy electrode at least partially overlapping with one of the touch drive electrodes protrudes to and overlaps with the touch drive electrode adjacent thereto, is 10% or less, when viewed in a direction vertical to the insulating substrate (the third configuration).

According to the third configuration, output signals of the touch detection electrodes do not decrease, and touch detection errors do not decrease either, as compared with a configuration in which the dummy electrode does not protrude to an adjacent one of the touch drive electrodes, when viewed in a direction vertical to the insulating substrate. This therefore provides such a configuration that the dividing lines are hardly visually recognized, without a decrease in the touch position detection accuracy.

Any one of the first to third configurations is such that each piece of the electrode portion, obtained by dividing the electrode portion, has a length of ¼ of the width in the first direction of the touch drive electrode, and two of the electrode portions adjacent to each other with the slit being interposed therebetween are arranged so as to be shifted from each other by ¼ of the length in the first direction of the electrode portions (the fourth configuration).

According to the fourth configuration, the protrusion ratio is 10% or lower. This therefore provides such a configuration that the dividing lines are hardly visually recognized, without a decrease in the touch position detection accuracy, and further, this allows the touch detection electrodes having no dividing line to be hardly visually recognized.

Any one of the first to fourth configurations can be such that the slit is repeatedly bent in a zigzag shape, while, as an entire slit, extending in the first direction, and the electrode portion is divided by, as a dividing line, a line parallel with either one of a first linear portion and a second linear portion that compose the slit in the zigzag shape (the fifth configuration).

According to the fifth configuration, the dividing line for the electrode portions of the dummy electrode is a line in accordance with the shape of the slit provided in the dummy electrode, whereby the dividing line is made more hardly recognizable.

Any one of the first to fifth configurations can be such that an end of the dummy electrode is in a taper shape (the sixth configuration).

In a case where an end of the dummy electrode is in a taper shape, if the dummy electrode is divided by continuous straight dividing lines parallel to the direction in which the touch drive electrode extends, the dividing line is noticeable. According to the sixth configuration, however, even if the end of the dummy electrode is in a taper shape, the dividing line is hardly visually recognized during a period while the power source of the display device is OFF, or during a period while a dark image such as a black image is displayed.

A display device of the seventh configuration includes a touch panel of any one of the first to sixth configurations. With the seventh configuration, the dividing lines of the dummy electrodes are hardly visually recognized during a period while the power source of the display device is OFF, or during a period while a dark image such as a black image is displayed. This makes it possible to, for example, improve the appearance of the display device in a power source off state.

The seventh configuration can be such that the display device is a liquid crystal display in which a liquid crystal layer is interposed between the insulating substrate and the counter substrate, wherein the touch drive electrodes are arranged between the insulating substrate and the counter substrate, and the touch detection electrodes are arranged on one of surfaces of the insulating substrate, the surface being on a side opposite to a surface of the insulating substrate on which the touch drive electrodes are arranged (the eighth configuration).

Embodiment

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios.

Figure 2:
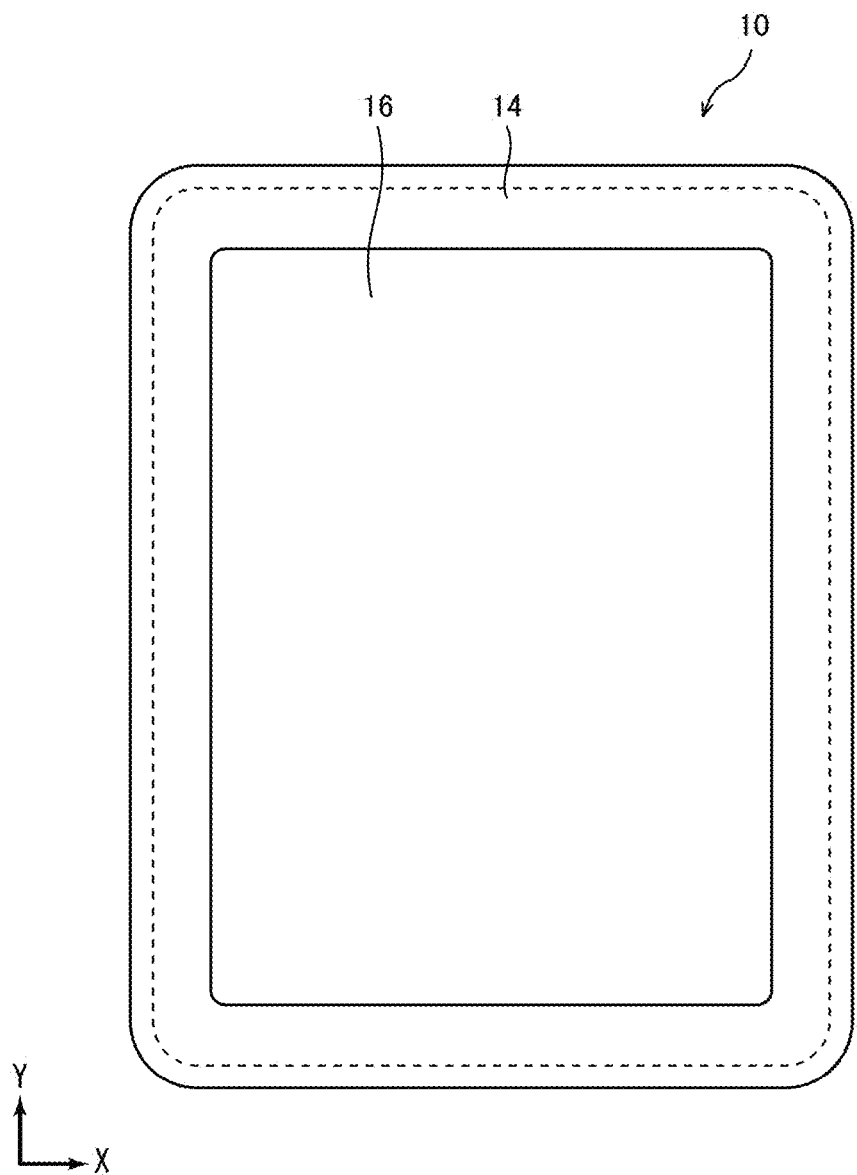
FIG. 2 is a plan view of a touch panel-equipped display device in one embodiment.

FIG. 1 illustrates a cross-sectional configuration of a touch panel-equipped display device 10 in one embodiment. FIG. 2 is a plan view illustrating the touch panel-equipped display device 10 in one embodiment. The display device 10 includes a liquid crystal panel 11 with a touch sensor function, a backlight device (lighting device) 13, a bezel 14, a case 15, and a cover 16. The liquid crystal panel 11 with a touch sensor function is a panel obtained by integrating a touch panel and a liquid crystal panel. Regarding this display device 10, the side thereof on which the cover 16 is provided is the front side (the image viewed side), and the side thereof on which the case 15 is provided is the rear side.

The liquid crystal panel 11 with a touch sensor function has a function of displaying an image, and a touch sensor function of detecting a touched position. More specifically, the liquid crystal panel 11 with a touch sensor function has a configuration that includes: a liquid crystal panel (display panel) that includes a pair of insulating substrates and a liquid crystal layer as a display function layer provided between the substrates; touch drive electrodes provided between the pair of substrates of the liquid crystal panel; and touch detection electrodes provided on a front side of the substrate on the front side of the display panel.

The backlight device 13 is a light source that emits light toward the liquid crystal panel 11 with a touch sensor function.

The cover 16 is arranged on an outer side of the liquid crystal panel 11 with a touch sensor function so as to protect the liquid crystal panel 11 with a touch sensor function. This cover 16 is made of a material that has excellent impact resistance, for example, tempered glass. The liquid crystal panel 11 with a touch sensor function, and the cover 16, are bonded and integrated with each other with an approximately transparent adhesive (not shown) being interposed therebetween.

The bezel 14 holds the cover 16 and the liquid crystal panel 11 with a touch sensor function together, between the same and the backlight device 13. The bezel 14 is attached to the case 15, and the case 15 houses the backlight device 13.

Figure 3:
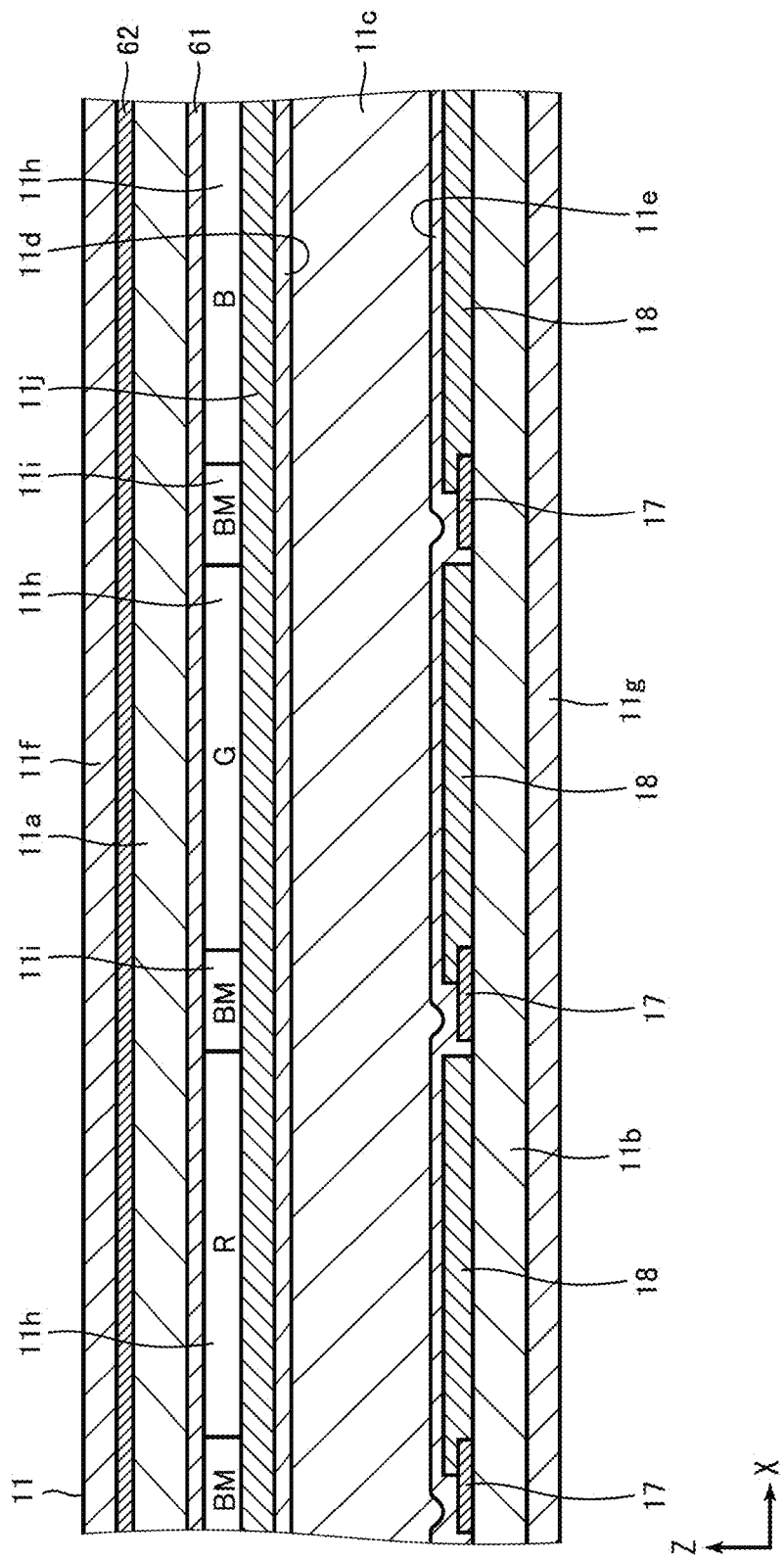
FIG. 3 is a schematic cross-sectional view of the liquid crystal panel with a touch sensor function.
Figure 4:
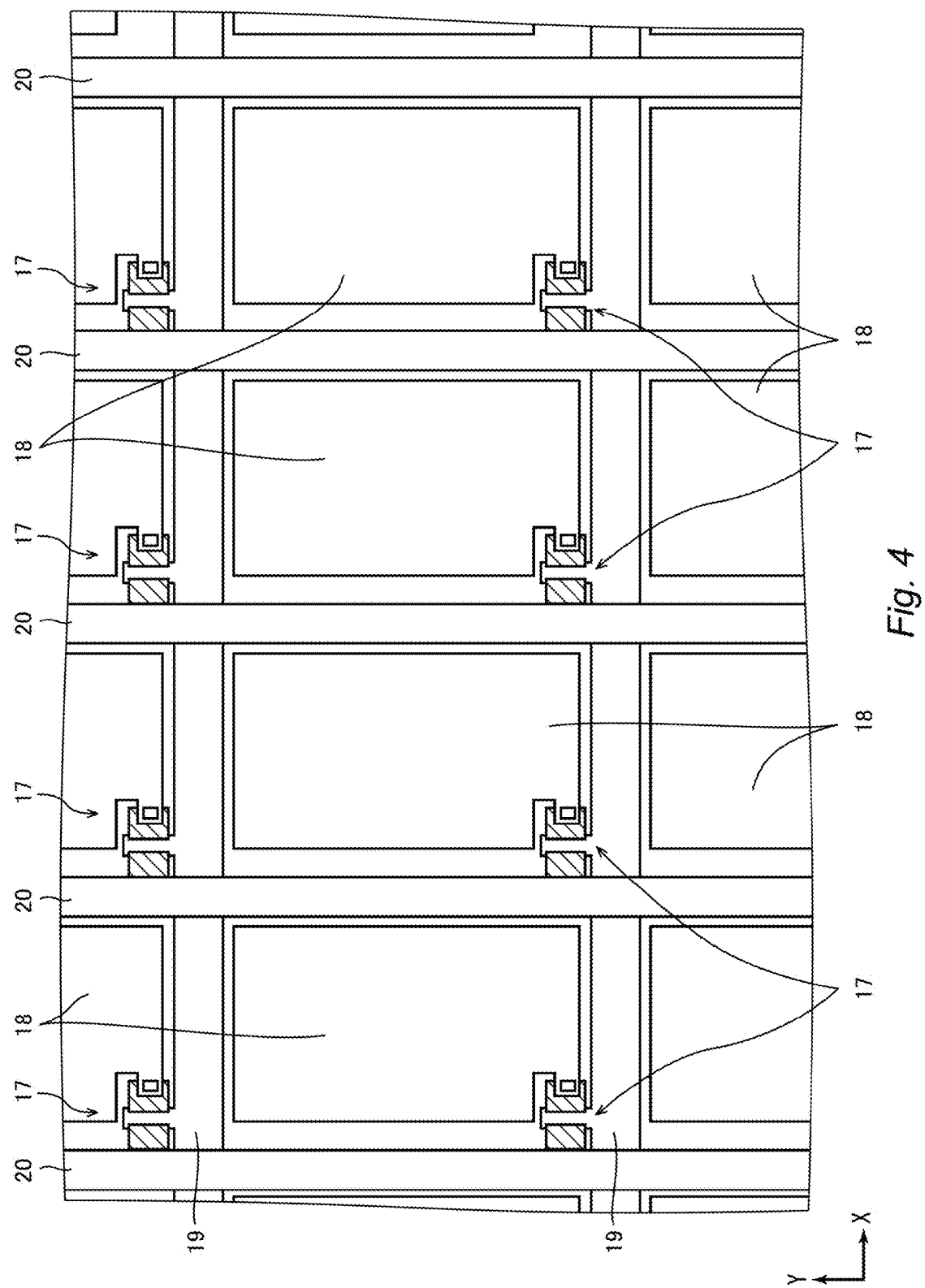
FIG. 4 is an enlarged plan view illustrating a plan-view configuration in a display section of an array substrate that composes the liquid crystal panel with a touch sensor function.
Figure 5:
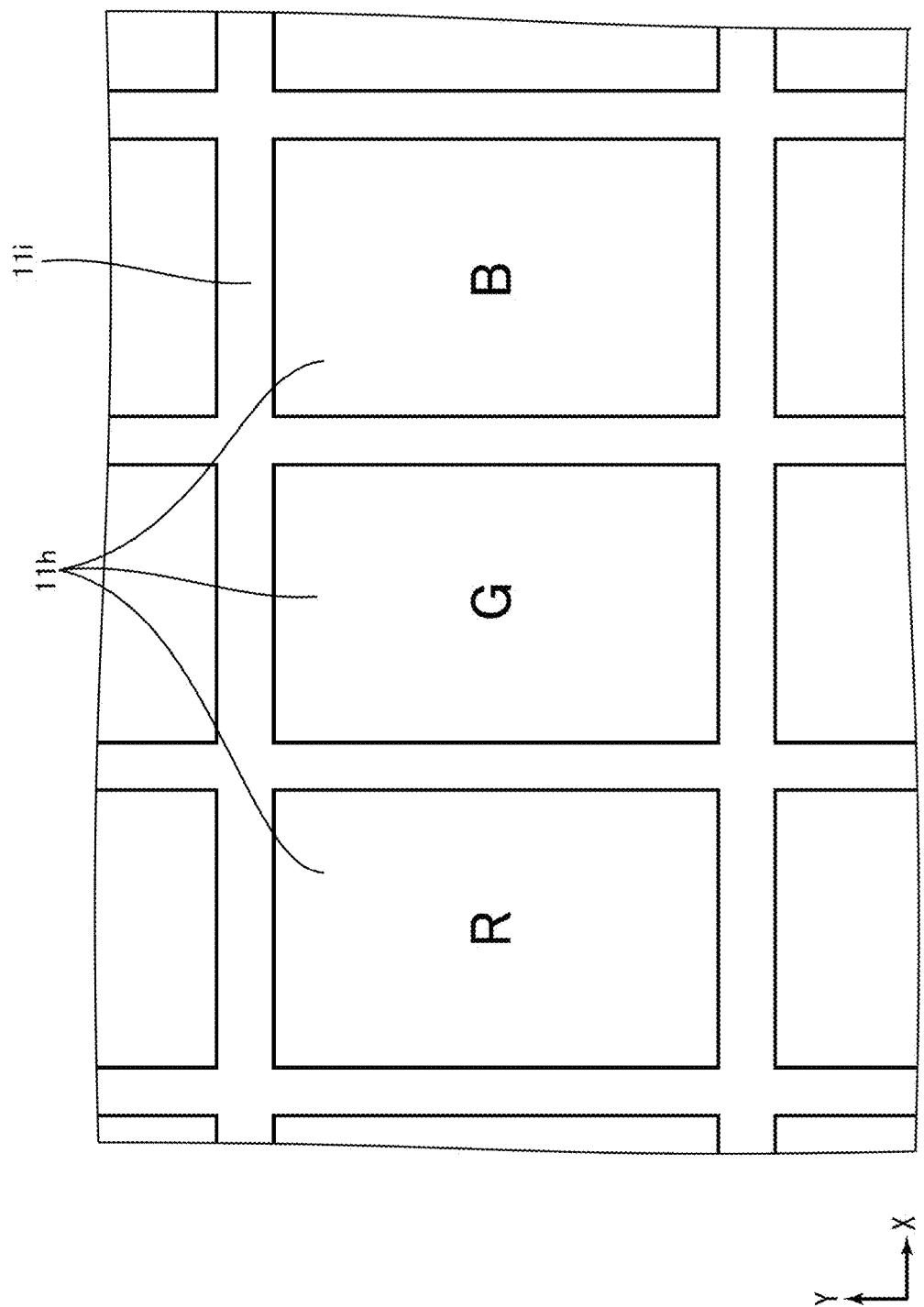
FIG. 5 is an enlarged plan view illustrating a plan-view configuration in a display section of a CF substrate that composes the liquid crystal panel with a touch sensor function.

FIG. 3 is a schematic cross-sectional view of the liquid crystal panel 11 with a touch sensor function. FIG. 4 is an enlarged plan view illustrating a plan-view configuration in a display section of an array substrate that composes the liquid crystal panel 11 with a touch sensor function. FIG. 5 is an enlarged plan view illustrating a plan-view configuration in a display section of a CF substrate that composes the liquid crystal panel 11 with a touch sensor function.

The liquid crystal panel 11 with a touch sensor function includes a pair of substrates 11a and 11b that are transparent (that have excellent translucency), and a liquid crystal layer 11c interposed between the substrates 11a and 11b, as illustrated in FIG. 3. The liquid crystal layer 11c contains liquid crystal molecules as a substance whose optical properties change in response to the application of an electric field. The substrates 11a and 11b are bonded with each other with a sealant (not shown) in a state in which a cell gap corresponding to the thickness of the liquid crystal layer 11c is maintained therebetween.

Each of the substrates 11a and 11b includes an approximately transparent glass substrate, and has such a configuration that a plurality of films are laminated on the glass substrate by a known photolithography method or the like. Among the substrates 11a and 11b, the CF substrate (counter substrate) 11a is on the front side, and the array substrate (active matrix substrate) 11b is on the rear side (back side).

On the respective inner side surfaces of the substrates 11a and 11b, alignment films 11d and 11e for aligning the liquid crystal molecules contained in the liquid crystal layer 11c are formed, respectively, as illustrated in FIG. 3. On the respective outer side surfaces of the substrates 11a and 11b, polarizing plates 11f and 11g are laminated, respectively.

On the inner side surface of the array substrate 11b (the liquid crystal layer 11c side, the side opposed to the CF substrate 11a), a plurality of thin film transistors (TFTs) 17, which are switching elements, and a plurality of pixel electrodes 18, are provided in matrix, as illustrated in FIGS. 3 and 4. Gate lines 19 and source lines 20 forming a lattice pattern are arranged so as to enclose these TFTs 17 and pixel electrodes 18. In other words, at intersections of the gate lines 19 and the source lines 20 forming the lattice pattern, the TFTs 17 and the pixel electrodes 18 are arranged.

The gate lines 19 are connected with gate electrodes of the TFTs 17, and the source lines 20 are connected with the source electrodes of the TFTs 17. The pixel electrodes 18 are connected to the drain electrodes of the TFTs 17. Further, each pixel electrode 18 is in a portrait oriented rectangular shape when viewed in a plan view, and is formed with a translucent conductive film made of a material having excellent translucency and conductivity, such as indium tin oxide (ITO) or zinc oxide (ZnO).

On the other hand, as illustrated in FIGS. 3 and 5, color filters 11h are provided in matrix on the CF substrate 11a, in such a manner that the color portions in colors of red (R), green (G), blue (B) and the like overlap the pixel electrodes 18 on the array substrate 11b side when viewed in a plan view. Between the respective color portions that form the color filter 11h, a light-shielding layer (black matrix) 11i in a lattice pattern for preventing the color mixing is formed. The light-shielding layer 11i is arranged so as to overlap the above-described gate lines 19 and the source lines 20 when viewed in a plan view. Over an entire surface of the color filters 11h and the light-shielding layer 11i, a counter electrode 11*j* is provided, which is opposed to the pixel electrodes 18 on the array substrate 11*b* side.

In this liquid crystal panel 11 with a touch sensor function, as illustrated in FIGS. 3 to 5, one display pixel as a display unit is composed of a set of the color portions in the three colors of R (red), G (green), and B (blue) and the three pixel electrodes 18 opposed to the color portions, respectively. The display pixel is composed of a red color subpixel having a color portion of R, a green color subpixel having a color portion of G, and a blue color subpixel having a color portion of B. These subpixels of the respective colors are arranged side by side repeatedly in the row direction (X axis direction) on the plate surface of the liquid crystal panel 11, thereby forming a pixel group, and a multiplicity of such pixel groups are arrayed in the column direction (Y axis direction). In other words, a plurality of the display pixels are arranged in matrix. In the present embodiment, the subpixels are arranged in a so-called stripe array.

The following describes the touch sensor function. The liquid crystal panel 11 with a touch sensor function includes touch drive electrodes 61 and touch detection electrodes 62 that compose the touch sensor. As illustrated in FIG. 3, the touch drive electrodes 61 are provided on the back side (the liquid crystal layer 11*c* side) of the CF substrate 11*a*, and the touch detection electrodes 62 are provided on the front side of the CF substrate 11*a*. More specifically, the touch drive electrodes 61 are provided between the CF substrate 11*a* on one hand and the color filters 11*h* and the light-shielding layer 11*i* on the other hand. Further, the touch detection electrodes 62 are provided between the CF substrate 11*a* and the polarizing plate 11*f*. This touch sensor is of the so-called projection type electrostatic capacitance method, and the detection method thereof is of the mutual capacitance type.

It should be noted that the touch drive electrodes 61 and the touch detection electrodes 62 may be formed with a thin line pattern (mesh and the like) of metal lines made of copper (Cu) or the like. By forming the electrodes with a thin line pattern, the parasitic capacitance can be decreased. Further, the touch drive electrodes 61 may be provided between the light-shielding layer 11*i* and the counter electrode 11*j*. In a case where the touch drive electrodes 61 are provided between the light-shielding layer 11*i* and the counter electrode 11*j*, an insulating layer is provided between touch drive electrodes 61 and the counter electrode 11*j*.

Figure 6:
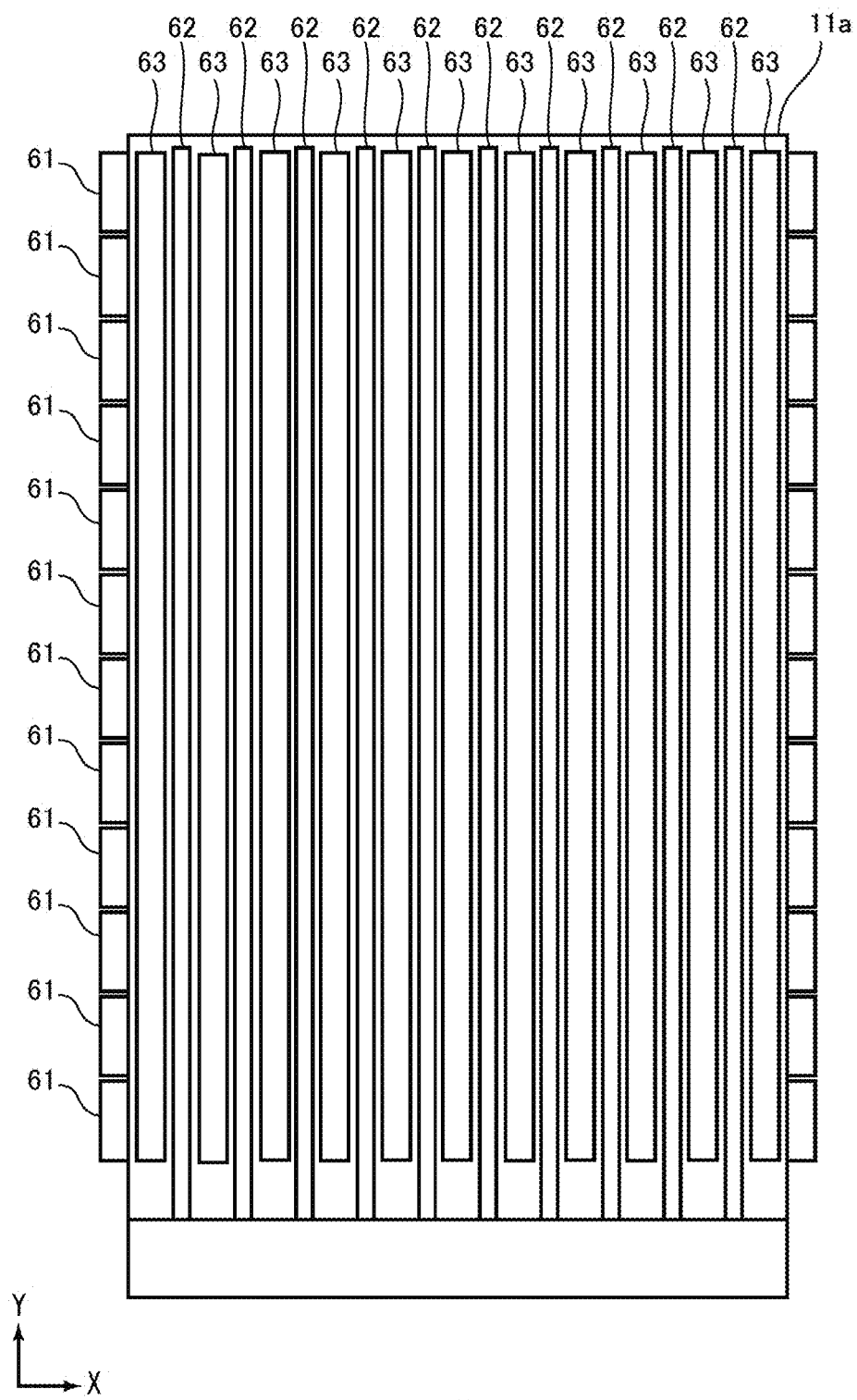
FIG. 6 is a plan view illustrating an arrangement configuration of touch drive electrodes and touch detection electrodes.

FIG. 6 is a plan view illustrating the arrangement configuration of the touch drive electrodes 61 and the touch detection electrodes 62. A plurality of touch drive electrodes 61 extending in the X axis direction (the second direction) are provided so as to be arrayed in the Y axis direction (the first direction) at predetermined intervals. Further, a plurality of touch detection electrodes 62 extending in the Y axis direction are provided so as to be arrayed in the X axis direction at predetermined intervals. The touch drive electrodes 61 and the touch detection electrodes 62 are formed with conductive films made of a material having excellent translucency and conductivity, such as indium tin oxide (ITO) or zinc oxide (ZnO).

The following simply explains a method for detecting a touched position. The touch drive electrodes 61 are sequentially scanned so that an input signal is input thereto, and output signals output from the touch detection electrodes 62 are detected. When any area of the surface of the touch sensor-equipped display device 10 is touched, the electrostatic capacitance between the touch drive electrode 61 and the touch detection electrode 62 at the touched position changes. Based on an output signal output from the touch detection electrode 62, the position where the electrostatic capacitance has changed is detected, and the detected position is identified as the touched position.

Between the plurality of the touch detection electrodes 62 provided on the front side of the CF substrate 11*a*, the dummy electrodes 63 are provided. In other words, in each space between adjacent ones of the plurality of touch detection electrodes 62 arrayed in the X axis direction at predetermined intervals, the dummy electrodes 63 are provided. It should be noted that, in FIG. 6, each dummy electrodes 63 is in a shape extending in the Y axis direction, but actually, as is described below, it is divided by a plurality of dividing lines.

The dummy electrodes 63 are provided for the purpose of preventing the light transmission rate and the like from becoming different between the positions where the touch detection electrodes 62 are provided and the positions where they are not provided, on the front side of the CF substrate 11*a*. The dummy electrodes 63, therefore, are formed with conductive films made of the same material as that of the touch detection electrodes 62, that is, a material having excellent translucency, such as ITO or ZnO. It should be noted that the dummy electrodes 63 are not connected with other lines or electrodes, and are in an electrically floating state.

The touch detection electrodes 62 and the dummy electrodes 63 have predetermined refractive indices, though they are transparent. In the touch detection electrodes 62 and the dummy electrodes 63, therefore, a plurality of slits are provided so as to make the touch detection electrodes 62 and the dummy electrodes 63 unnoticeable when the display device 10 is viewed.

Figure 7:
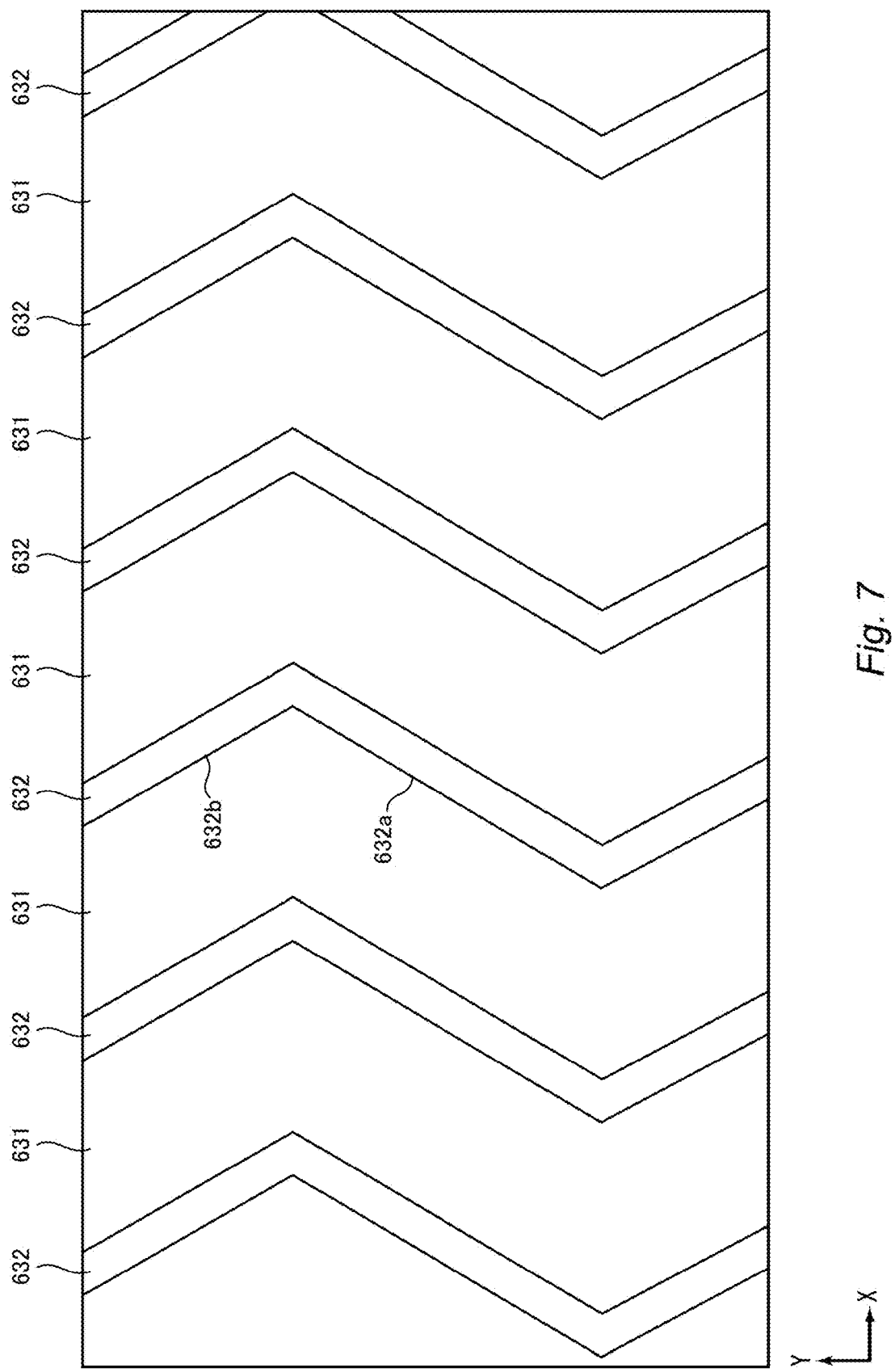
FIG. 7 is a diagram for explaining a shape of a slit provided in the dummy electrode.

FIG. 7 is a diagram for explaining the shape of slits provided in the dummy electrodes 63, which is an enlarged view of a part of the dummy electrode 63. It should be noted that slits in the identical shape are provided in the touch detection electrodes 62.

The dummy electrode 63 is composed of a plurality of electrode portions 631 formed with translucency conductive films and a plurality of slits 632 provided between the electrode portions 631. In other words, a plurality of slits 632 extending substantially in the Y axis direction are provided in the dummy electrode 63, and the dummy electrode 63 is segmented by the slits 632 into a plurality of electrode portions 631 that are arrayed in the X axis direction.

Each slit 632 is repeatedly bent in a zigzag shape, while, when viewed as a whole, extending in the Y axis direction. In other words, the slit 632 is composed of first direction linear portions 632*a* extending in the first direction, and second direction linear portions 632*b* extending in the second direction that is different from the first direction. Here, the first direction linear portions 632*a* and the second direction linear portions 632*b* have the same width in the X axis direction, and the same length in the Y axis direction.

Here, as illustrated in FIG. 6, a plurality of the touch drive electrodes 61 are arranged in the Y axis direction. In a case where the dummy electrode 63 is provided so as to be across a plurality of the touch drive electrodes 61 when viewed in the direction vertical to the CF substrate 11*a*, there is a possibility that signals supplied to the touch drive electrodes 61 would mix through the dummy electrode 63. To prevent the mixing of the signals, therefore, the dummy electrode 63 is preferably divided so that one divided portion of the dummy electrode 63 should not be provided across a plurality of (at least two) touch drive electrodes 61.

Figure 8:
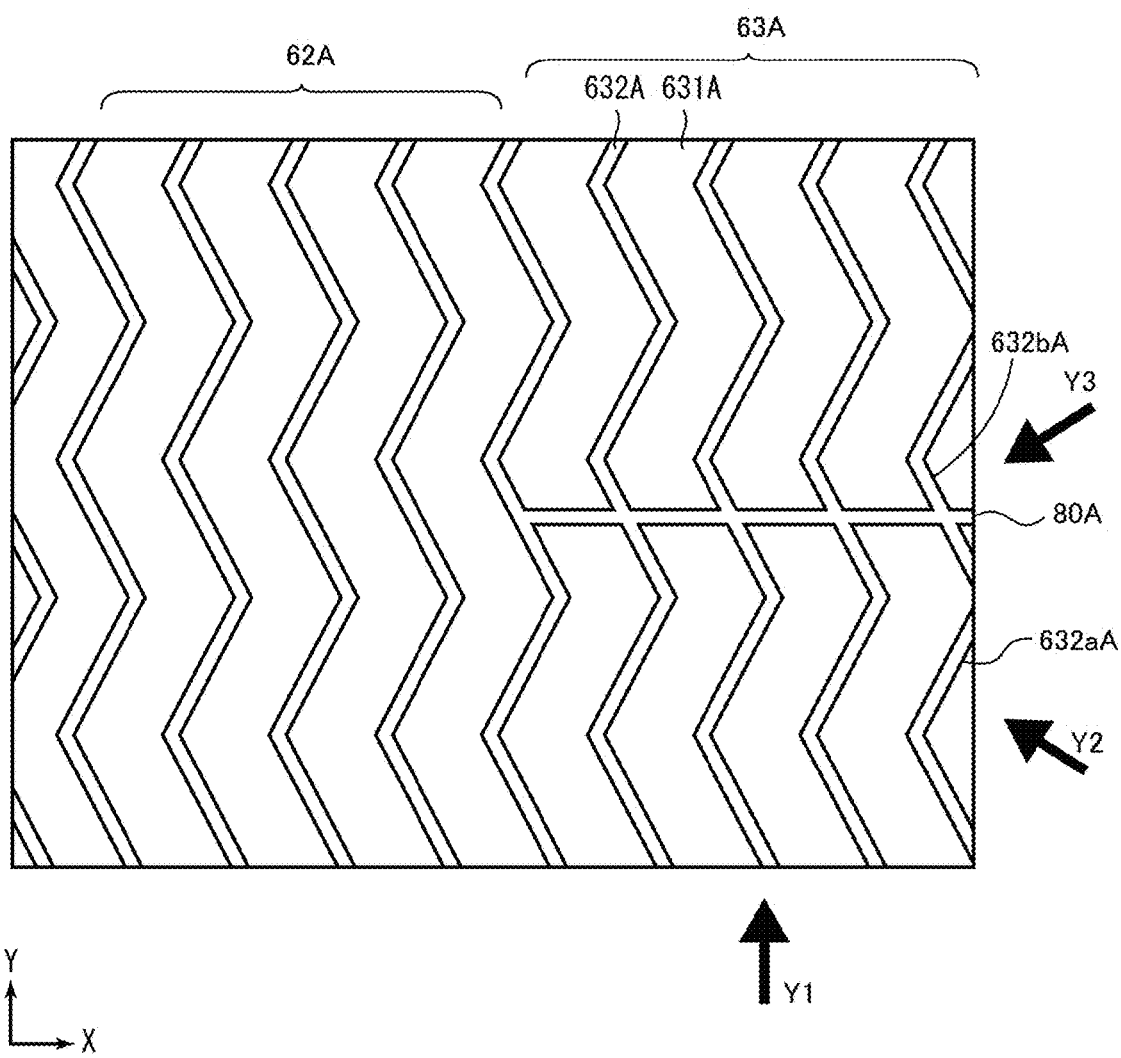
FIG. 8 illustrates dividing lines of a dummy electrode in a conventional configuration.

FIG. 8 illustrates a dividing line 80A of a conventional dummy electrode 63A. In FIG. 8, in order to distinguish the conventional configuration from the configuration of the present embodiment, the character of "A" is attached after each of the reference numerals indicating the constituent members. In FIG. 8, the touch detection electrode 62A are illustrated together with the dummy electrode 63A. In the conventional touch sensor-equipped display device, the dummy electrode 63A is divided by a continuous straight line 80A parallel with the direction (X axis direction) in which the touch drive electrodes 61A extend, so that each dummy electrode 63A should not be provided across adjacent two of the touch drive electrodes 61A.

Figure 9:
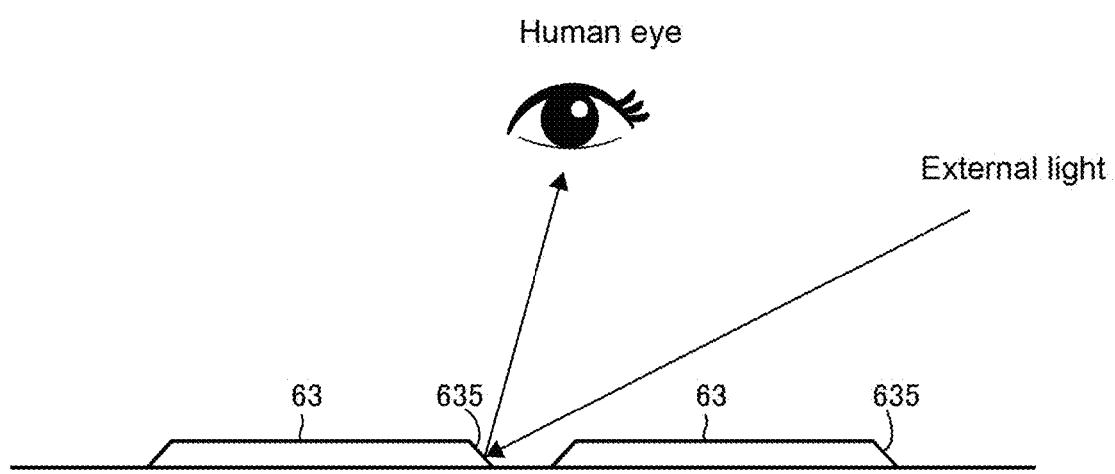
FIG. 9 illustrates that an edge portion of a conductive film that forms the dummy electrode is tilted in a taper shape.

As described above, the dummy electrodes 63 are formed with conductive films made of a material having excellent translucency, such as ITO or ZnO. Each of ends (edge portions) 635 of the dummy electrodes 63 is tilted in a taper shape as illustrated in FIG. 9. The edge pattern of the dummy electrode 63 is recognizable when it is viewed in a specific direction.

In a case where the dummy electrode 63A is divided by the continuous straight line 80A parallel with the X axis as illustrated in FIG. 8, therefore, when viewed in the direction indicated by the arrow Y1 in FIG. 8 under a light source of approximately parallel light such as the sun light or the like during a period while the power source of the display device is OFF or during a period while a dark image such as a black image is displayed, the edge patterns of the dummy electrode 63A corresponding to the dividing line 80A becomes recognizable.

Figure 10:
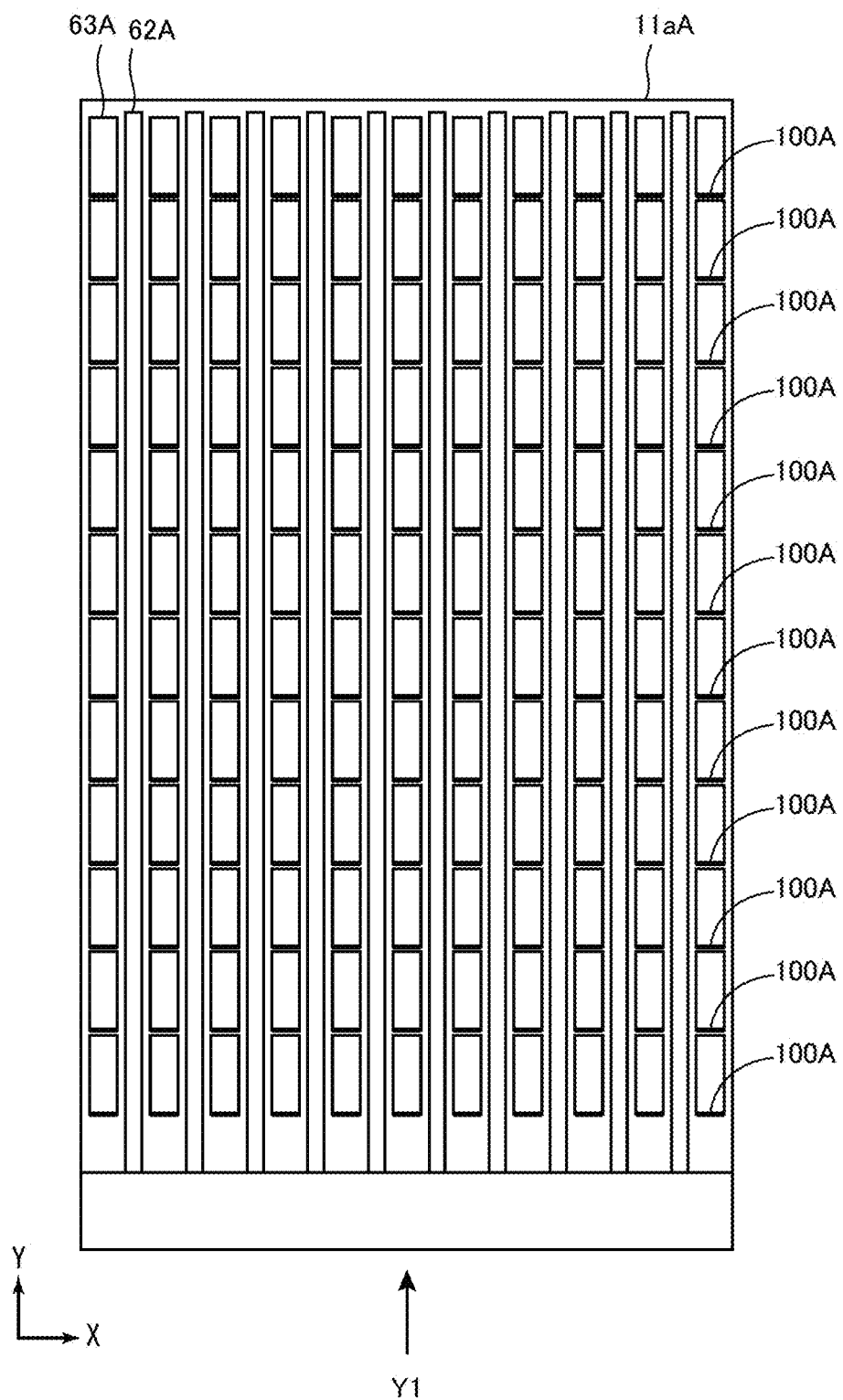
FIG. 10 is an image diagram illustrating edge patterns of dummy electrodes in a conventional touch sensor-equipped display device in which the dummy electrodes are divided by continuous straight lines parallel to a direction in which touch drive electrodes extend, the image diagram illustrating that the edge patterns of the dummy electrodes are visible when viewed in a direction from a lower end of the display device.

FIG. 10 is an image diagram illustrating edge patterns 100A of the dummy electrodes 63A in a conventional touch sensor-equipped display device in which the dummy electrodes 63A are divided by continuous straight dividing lines parallel to the X axis, the edge patterns 100A being visible when viewed in the direction indicated by the arrow Y1. In FIG. 10 also, the character of "A" is attached after each of the reference numerals indicating the constituent members, in order to distinguish them from the constituent members of the present embodiment. As illustrated in FIG. 10, when viewed in the direction indicated by the arrow Y1, there is a possibility that the edge patterns 100A of a plurality of the dummy electrodes 63A in the Y direction are visible.

In the touch panel-equipped display device 10 of the present embodiment, therefore, two adjacent ones of the electrode portions 631, which are adjacent to each other with the slit 632 of the dummy electrode 63 being interposed therebetween, are divided at positions different in the Y axis direction. More specifically, the dummy electrode 63 is divided, not with a continuous straight dividing line like the dividing line 80A as illustrated in FIG. 8, but with a plurality of dividing lines located at positions different in the Y axis direction. It should be noted that, since the dummy electrode 63 is divided into a plurality of electrode portions 631 by the slits 632, as described above, "the division of the dummy electrode 63" and "the division of the electrode portions 631" mean the same.

Here, when viewed in the direction indicated by the arrow Y2 in FIG. 8, it seems that the pattern edges of the first direction linear portions 632aA that compose the slit 632A of the dummy electrode 63A are visible, but these pattern edges of the first direction linear portions 632aA are hardly recognized when viewed by human eyes, since they are uniformly present. Likewise, when viewed in the direction indicated by the arrow Y3 in FIG. 8, these pattern edges of the second direction linear portions 632bA composing the slit 632A of the dummy electrode 63A are hardly recognized when viewed by human eyes, since they are uniformly present.

Figure 11:
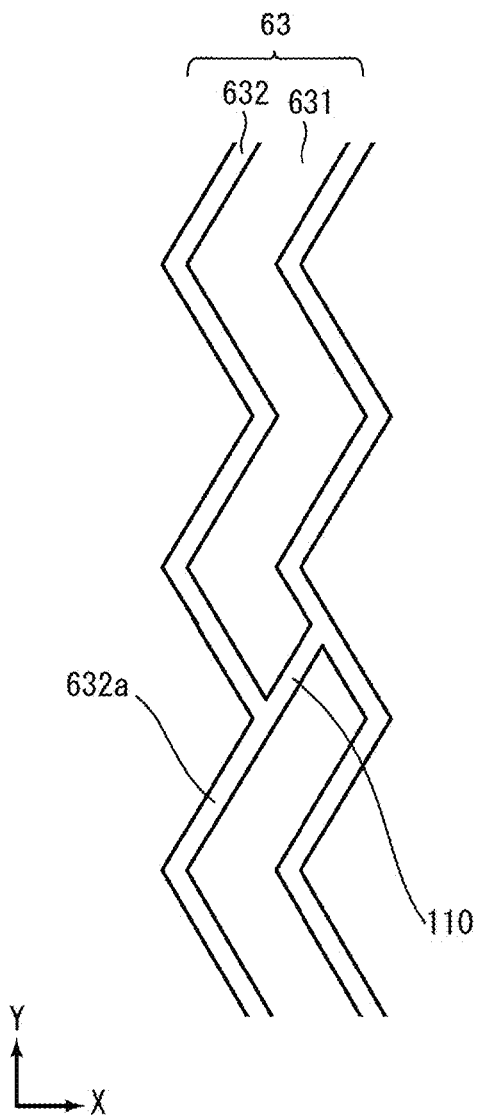
FIG. 11 illustrates a line obtained by extending a first direction linear portion of a slit, the line being a dividing line for dividing a dummy electrode.

In the touch panel-equipped display device of the present embodiment, therefore, the electrode portions 631 of the dummy electrodes 63 are divided, not by lines in parallel with the touch drive electrodes 61, but by dividing lines parallel to either one of the first direction linear portions 632a and the second direction linear portions 632b that form the slit 632 in the zigzag shape. Particularly in the present embodiment, the electrode portions 631 of the dummy electrodes 63 are divided by dividing lines that are obtained by extending either one of the first direction linear portions 632a and the second direction linear portions 632b of the slits 632. FIG. 11 illustrates an example in which a line obtained by extending the first direction linear portion 632a of the slit 632 is used as the dividing line 110.

FIGS. 12 to 15 are schematic diagrams illustrating examples of division of the dummy electrode 63 in a touch panel-equipped display device in the present embodiment. As described above, the dummy electrode 63 is divided by, as dividing lines, lines obtained by extending the first direction linear portion 632a or the second direction linear portion 632b of the slit 632, but in the schematic diagrams in FIGS. 12 to 15, in order to clearly illustrate the positions at which the dummy electrode 63 is divided, a state in which the dummy electrode 63 is assumed to be divided by lines parallel to a direction in which the touch drive electrodes 61 extend is illustrated. Further, in the schematic diagrams in FIGS. 12 to 15, the illustration of the slits 632 is omitted, and the electrode portions 631 actually in a zigzag shape are illustrated in a linear shape.

In FIGS. 12 to 15, in order to distinguish the adjacent touch drive electrodes 61, they are denoted by reference symbols of "$61X_{n+1}$", "$61X_n$", and "$61X_{n-1}$". Further, only electrode portions 631 that at least partially overlap the touch drive electrode $61X_n$ when viewed in the direction vertical to the CF substrate 11a are illustrated.

Figure 12:
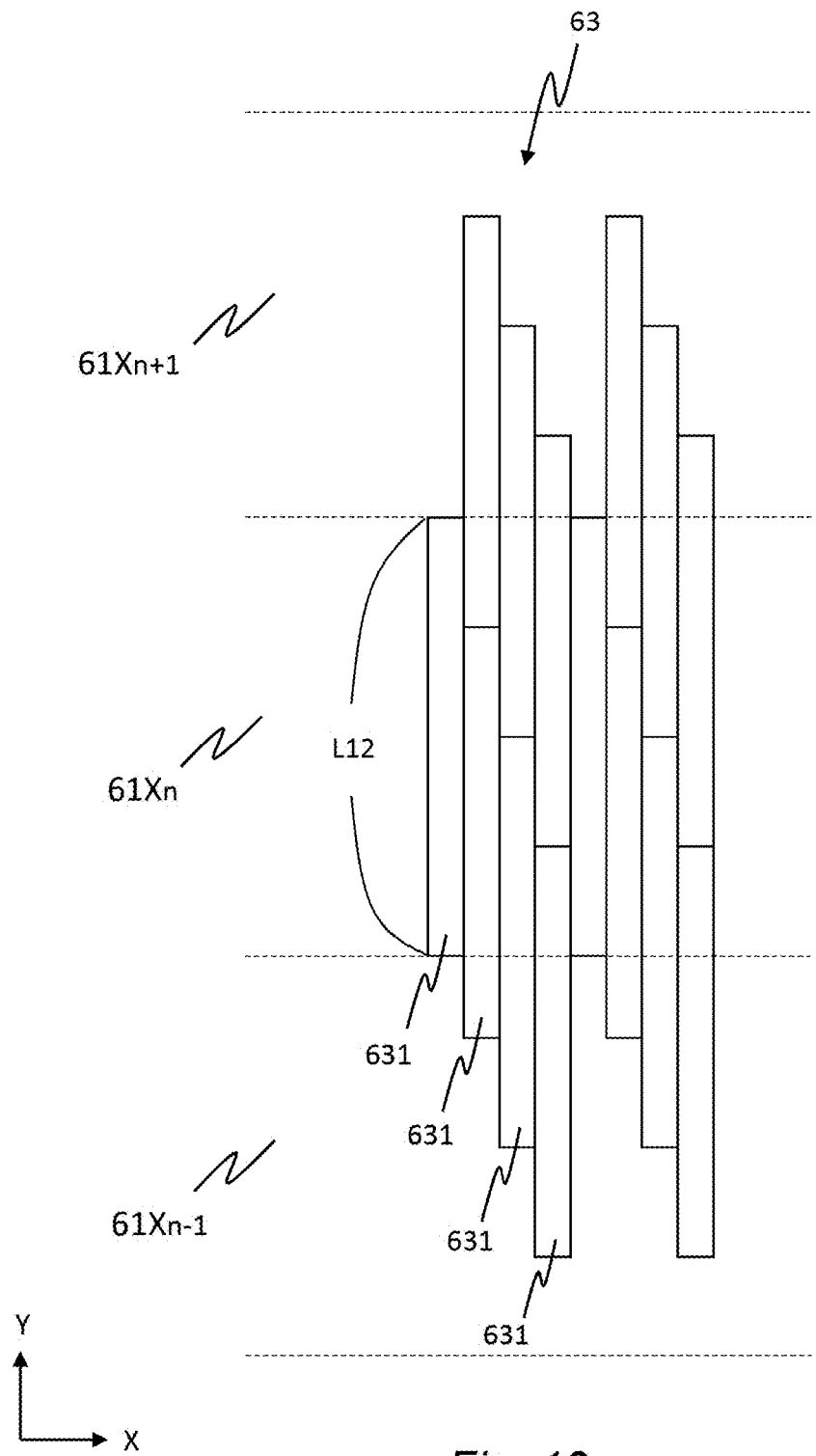
FIG. 12 is a schematic diagram illustrating one example of division of a dummy electrode in a touch panel-equipped display device in one embodiment.

In the example of division illustrated in FIG. 12, the length L12 in the Y axis direction of the electrode portion 631 of the dummy electrode 63 is equal to the width in the Y axis direction of the touch drive electrode 61. The length L12 in the Y axis direction of the dummy electrode 63, however, does not have to be completely equal to the width in the Y axis direction of the touch drive electrode 61, but, for example, it may be shorter than the width in the Y axis direction of the touch drive electrode 61. Regarding the electrode portions 631 of the dummy electrode 63 that are adjacent in the X axis direction, respective positions of division thereof are different from each other by ¼ of the length L12 in the Y axis direction of the electrode portion 631. In other words, the electrode portions 631 adjacent to each other with the slit 632 being interposed therebetween are arranged so as to be shifted by ¼ of the length L12 from each other. In this case, when viewed in the direction vertical to the CF substrate 11a, a protrusion ratio, which is a ratio by which the dummy electrode 63 that at least partially overlaps the touch drive electrode $61X_n$ protrudes toward and overlaps with the touch drive electrode $61X_{n-1}$ adjacent thereto is 37.5% (=(0/4+¼+²⁄₄+¾+0/4+¼+²⁄₄+¾)/8×100).

Figure 13:
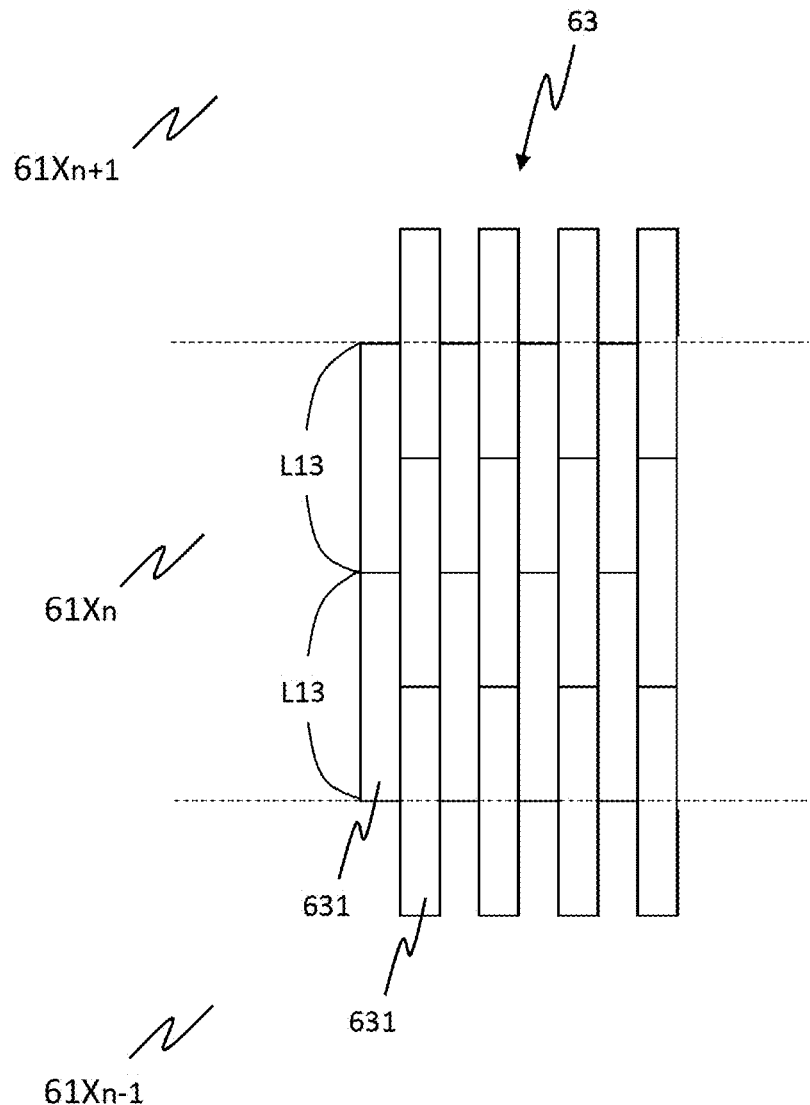
FIG. 13 is a schematic diagram illustrating another example of division of a dummy electrode in a touch panel-equipped display device in one embodiment.

In the example of division illustrated in FIG. 13, the length L13 in the Y axis direction of the electrode portion 631 of the dummy electrode 63 is ½ of the width in the Y axis direction of the touch drive electrode 61. The length L13 in the Y axis direction of the dummy electrode 63, however, does not have to be completely equal to ½ of the width in the Y axis direction of the touch drive electrode 61.

Regarding the electrode portions 631 of the dummy electrode 63 that are adjacent in the X axis direction, respective positions of division thereof are different from each other by ½ of the length L13 in the Y axis direction of the electrode portion 631. In other words, the electrode portions 631 adjacent to each other with the slit 632 being interposed therebetween are arranged so as to be shifted by ½ of the length L13 from each other. In this case, when viewed in the direction vertical to the CF substrate 11a, a protrusion ratio, which is a ratio by which the dummy electrode 63 that at least partially overlaps the touch drive electrode $61X_n$ protrudes toward and overlaps with the touch drive electrode $61X_{n-1}$ adjacent thereto, is 12.5% (=(0/4+¼+0/4+¼+0/4+¼+0/4+¼)/8×100).

Figure 14:
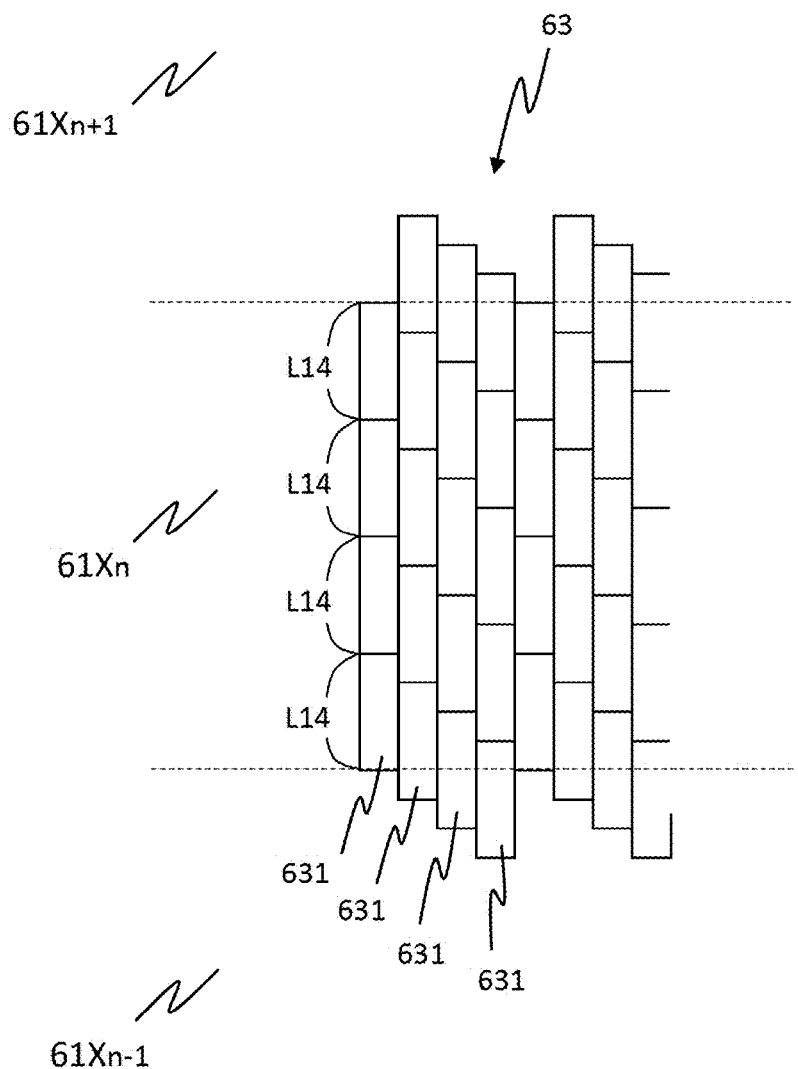
FIG. 14 is a schematic diagram illustrating still another example of division of a dummy electrode in a touch panel-equipped display device in one embodiment.

In the example of division illustrated in FIG. 14, the length L14 in the Y axis direction of the electrode portion 631 of the dummy electrode 63 is ¼ of the width in the Y axis direction of the touch drive electrode 61. The length L14 in the Y axis direction of the dummy electrode 63, however, does not have to be completely equal to ¼ of the width in the Y axis direction of the touch drive electrode 61. Regarding the electrode portions 631 of the dummy electrode 63 that are adjacent in the X axis direction, respective positions of division thereof are different from each other by ¼ of the length L14 in the Y axis direction of the electrode portion 631. In other words, the electrode portions 631 adjacent to each other with the slit 632 being interposed therebetween are arranged so as to be shifted by ¼ of the length L14 from each other. In this case, when viewed in the direction vertical to the CF substrate 11a, a protrusion ratio, which is a ratio by which the dummy electrode 63 that at least partially overlaps the touch drive electrode $61X_n$ protrudes toward and overlaps with the touch drive electrode $61X_{n-1}$ adjacent thereto, is 9.375% (=(0/16+1/16+2/16+3/16+0/16+1/16+2/16+3/16)/8×100).

Figure 15:
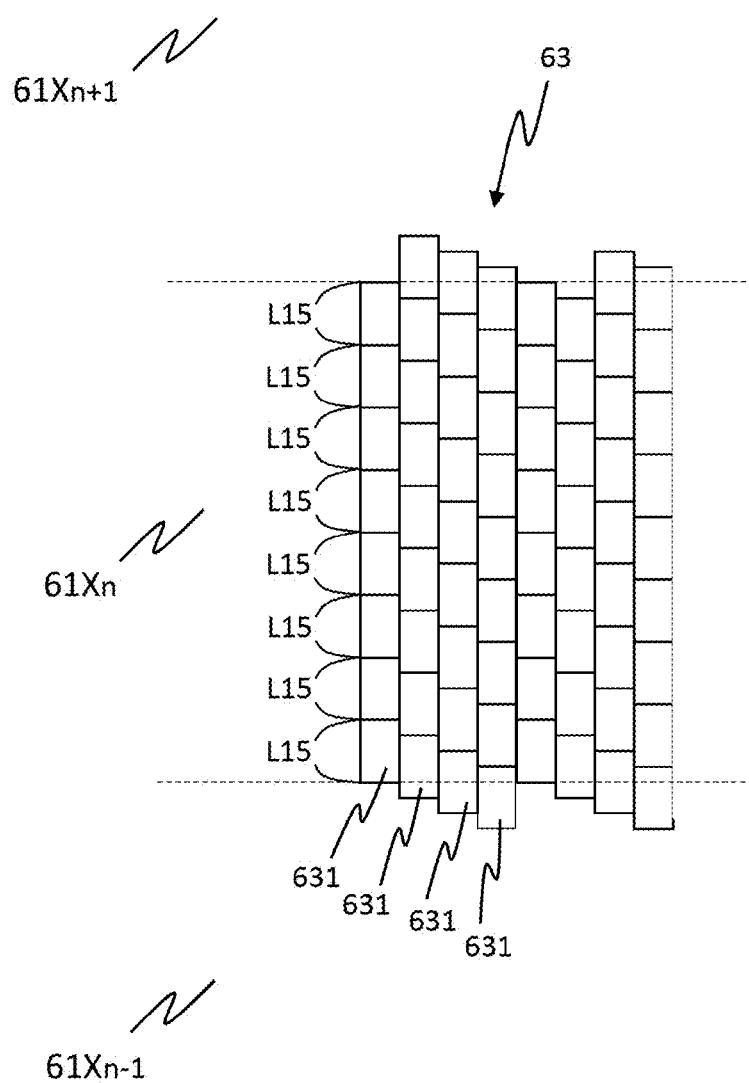
FIG. 15 is a schematic diagram illustrating still another example of division of a dummy electrode in a touch panel-equipped display device in one embodiment.

In the example of division illustrated in FIG. 15, the length L15 in the Y axis direction of the electrode portion 631 of the dummy electrode 63 is ⅛ of the width in the Y axis direction of the touch drive electrode 61. The length L15 in the Y axis direction of the dummy electrode 63, however, does not have to be completely equal to ⅛ of the width in the Y axis direction of the touch drive electrode 61. Regarding the electrode portions 631 of the dummy electrode 63 that are adjacent in the X axis direction, respective positions of division thereof are different from each other by ¼ of the length L15 in the Y axis direction of the electrode portion 631. In other words, the electrode portions 631 adjacent to each other with the slit 632 being interposed therebetween are arranged so as to be shifted by ¼ of the length L15 from each other. In this case, when viewed in the direction vertical to the CF substrate 11a, a protrusion ratio, which is a ratio by which the dummy electrode 63 that at least partially overlaps the touch drive electrode $61X_n$ protrudes toward and overlaps with the touch drive electrode $61X_{n-1}$ adjacent thereto, is 4.6875% (=(0/32+1/32+2/32+3/32+0/32+1/32+2/32+3/32)/8×100).

As described above, in the configuration of the present embodiment, when viewed in the direction vertical to the substrates 11a and 11b, the dummy electrode 63 not only overlaps with one touch drive electrode 61, but also partially overlaps another touch drive electrode 61 adjacent thereto. As compared with the configuration in which the dummy electrode 63 is divided so that one divided portion of the dummy electrode 63 should not be provided across a plurality of the touch drive electrodes 61, it can be predicted that an output signal that is output from the touch detection electrode 62 deteriorates.

Figure 16:
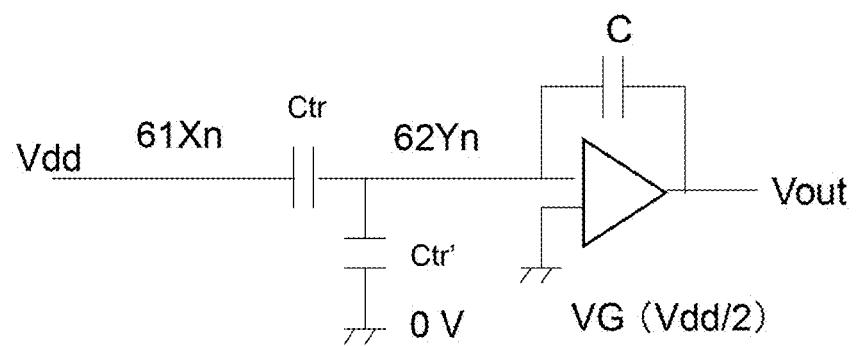
FIG. 16 is an equivalent circuit diagram in a case where a dummy electrode is provided across a plurality of the touch drive electrodes.

FIG. 16 is an equivalent circuit diagram in a case where the dummy electrode 63 is provided across adjacent touch drive electrodes 61, when viewed in the direction vertical to the substrates 11a, 11b. Here, it is assumed that, when viewed in the direction vertical to the substrates 11a, 11b, the dummy electrode 63 overlaps the touch drive electrode $61X_n$, and moreover, partially overlaps the touch drive electrode $61X_{n-1}$, too, which is adjacent to the touch drive electrode $61X_n$. In the drawing, Ctr represents an electrostatic capacitance between the touch drive electrode $61X_n$ and the touch detection electrode $62Y_n$, and Ctr' represents an electrostatic capacitance formed between the touch drive electrode $61X_{n-1}$ and the touch detection electrode $62Y_n$ with the dummy electrode 63 being interposed therebetween. Further, C represents a capacitor of an integrator inside a controller for detecting an output signal Vout of the touch detection electrode $62Y_n$.

Let the input signal of the touch drive electrode $61X_n$ be Vdd, and the output signal Vout of the touch detection electrode $62Y_n$ can be expressed by the following expression (1):

$$VOut = Vdd \cdot (Ctr - Ctr')/2C \quad (1)$$

As expressed by the expression (1), the output signal Vout of the touch detection electrode $62Y_n$ decreases when the electrostatic capacitance Ctr' is formed between the touch drive electrode $61X_{n-1}$ and the touch detection electrode $62Y_n$, with the dummy electrode 63 being interposed therebetween.

Figures 17A, 17B:
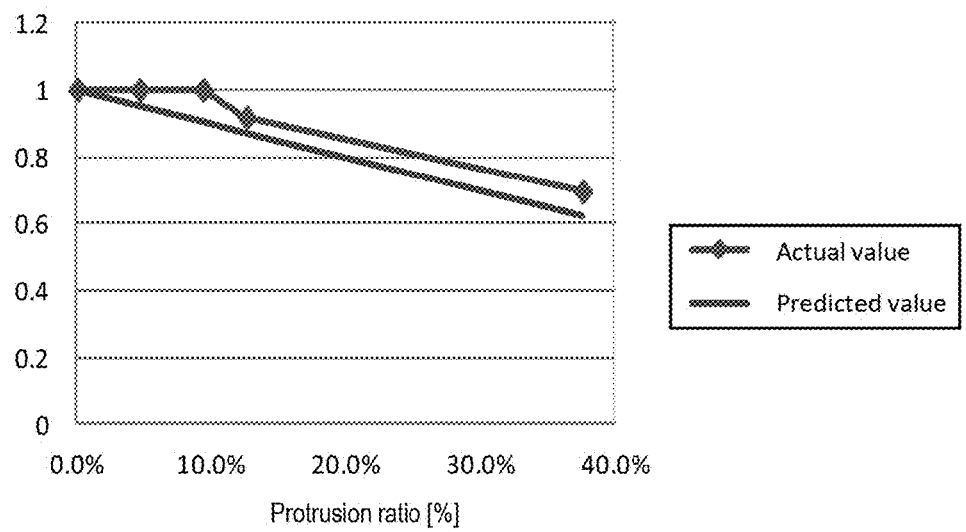
FIG. 17A illustrates data regarding a reference configuration and configurations illustrated in FIGS. 12 to 15, the data indicating: protrusion ratios; actual values of ratios of output signals Vout with respect to the output signal of the reference configuration; and predicted values of ratios of output signals Vout with respect to the output signal of the reference configuration.
FIG. 17B is a graph illustrating the relationship between the protrusion ratios on one hand, and the actual values of the ratios of the output signals Vout with respect to the output signal of the reference configuration, and the predicted values of the ratios of the output signals Vout with respect to the output signal of the reference configuration, on the other hand.

FIG. 17A illustrates data regarding a reference configuration and configurations illustrated in FIGS. 12 to 15 that indicate: protrusion ratios; actual values of ratios of output signals Vout with respect to the output signal of the reference configuration; and predicted values of ratios of output signals Vout with respect to the output signal of the reference configuration. FIG. 17B is a graph illustrating the relationship between the protrusion ratio on one hand, and the actual values of the ratios of the output signals Vout with respect to the output signal of the reference configuration, and the predicted values of the ratios of the output signals Vout with respect to the output signal of the reference configuration, on the other hand. The "reference configuration" refers to a configuration in which the dummy electrode 63 does not protrude to an adjacent touch drive electrode 61, when viewed in the direction vertical to the substrates 11a, 11b (the protrusion ratio=0%). Each protrusion ratio indicated is a value obtained by rounding a detected value to the first decimal place.

As illustrated in FIGS. 17A and 17B, in a case where the protrusion ratio is 10% or less, more specifically in a case where the protrusion ratio is 9.3% or less, the output signal Vout does not have much difference from the output signal in the case of the reference configuration in which the dummy electrode 63 does not protrude to an adjacent touch drive electrode 61. In cases of the configurations illustrated in FIGS. 14 and 15 among the configurations illustrated in FIGS. 12 to 15, the output signal Vout does not decrease as compared with the reference configuration in which the dummy electrode 63 does not protrude to the adjacent touch drive electrode 61. The configurations illustrated in FIGS. 14 and 15 are therefore considered preferable.

Figures 18A, 18B:
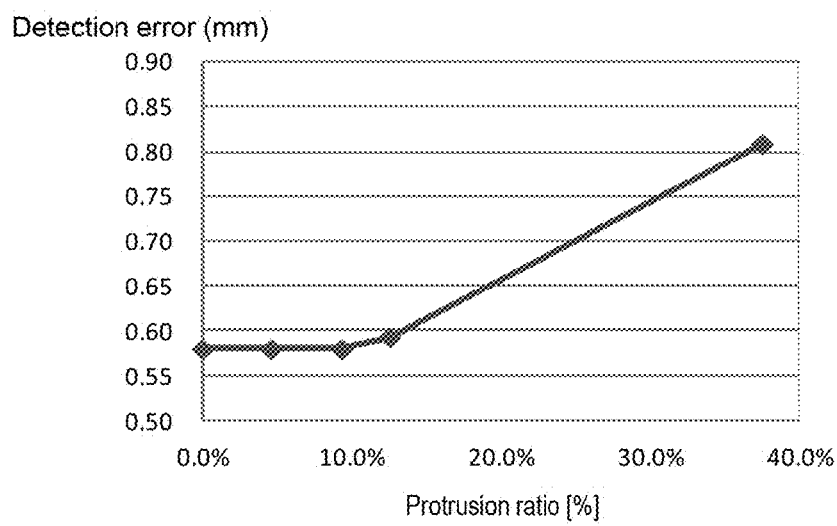
FIG. 18A illustrates data indicating the relationship between the dummy electrode protrusion ratio and the touch position detection error (mm).
FIG. 18B is a graph illustrating the relationship between the dummy electrode protrusion ratio and the touch position detection error (mm).

FIG. 18A illustrate data indicating the relationship between the protrusion ratio of the dummy electrode 63 and the touch position detection error (mm). FIG. 18B is a graph illustrating the relationship between the protrusion ratio of the dummy electrode 63 and the touch position detection error (mm). As the touch position detection error, the greatest value among values of errors in 20 measuring operations is indicated.

As illustrated in FIGS. 18A and 18B, in a case where the protrusion ratio is 10% or less, more specifically in a case where the protrusion ratio is 9.3% or less, the touch position detection error does not have much difference from that in the case of the reference configuration in which the dummy electrode 63 does not protrude to an adjacent touch drive electrode 61 (the protrusion ratio=0%). In cases of the configurations illustrated in FIGS. 14 and 15 among the configurations illustrated in FIGS. 12 to 15, the touch position detection error does not impair as compared with the reference configuration in which the dummy electrode 63 does not protrude to the adjacent touch drive electrode 61. The configurations illustrated in FIGS. 14 and 15 are therefore considered preferable.

Figure 19A:
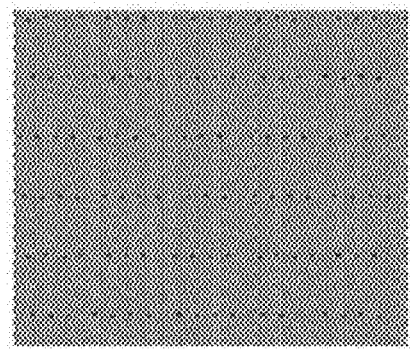
FIG. 19A illustrates how a display screen appears in a case where dummy electrodes are divided by a dividing method illustrated in FIG. 12.
Figure 19B:
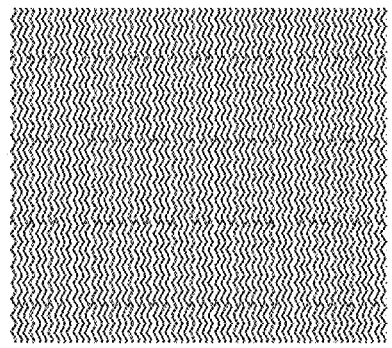
FIG. 19B illustrates how a display screen appears in a case where dummy electrodes are divided by a dividing method illustrated in FIG. 13.
Figure 19C:
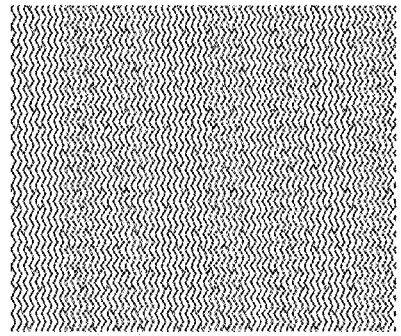
FIG. 19C illustrates how a display screen appears in a case where dummy electrodes are divided by a dividing method illustrated in FIG. 14.
Figure 19D:
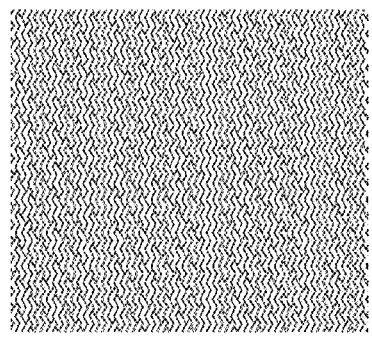
FIG. 19D illustrates how a display screen appears in a case where dummy electrodes are divided by a dividing method illustrated in FIG. 15.
Figure 19E:
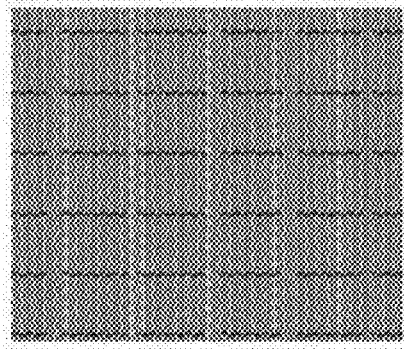
FIG. 19E illustrates how a display screen appears in a conventional case where dummy electrodes are divided by continuous straight lines parallel with the touch drive electrodes.

FIGS. 19A to 19E illustrate differences regarding how the display screen appears, when the method of dividing the dummy electrodes 63 is varied. FIGS. 19A to 19D correspond to examples of division illustrated in FIGS. 12 to 15, respectively. FIG. 19E corresponds to the conventional dividing method in which the dummy electrodes are divided by continuous straight dividing lines parallel to the touch drive electrodes. FIGS. 19A to 19E are enlarged views illustrating a part of the display screen.

As compared with the case of the conventional dividing method in which the dummy electrodes are divided by continuous straight dividing lines parallel to the X axis (see FIG. 18E), dividing lines are unnoticeable in cases of the driving methods of the present embodiment illustrated in FIGS. 12 to 15. In particular, as the dividing lines for dividing the dummy electrode 63 increases in number (the length in the Y axis direction of the electrode portion 631 decreases), the dividing lines become more unnoticeable. The degree of noticeability of the dividing lines decreases in the order of FIG. 12, FIG. 13, FIG. 14, and FIG. 15.

If divisions of the dummy electrode 63 are too many in number as in the case of the method illustrated in FIG. 15, however, the dividing lines increase in number, which causes the touch detection electrodes 62 having no dividing line become noticeable (see FIG. 19D). This indicates that the dividing lines are made unnoticeable, and the touch detection electrodes 62 are made unnoticeable, too, by the dividing method illustrated in FIG. 14, among the dividing methods illustrated in FIGS. 12 to 15. Besides, from the viewpoints of the ratio of the output signal Vout with respect to the output signal in the reference configuration (see FIGS. 17A, 17B) and the touch position detection error (mm) (see FIGS. 18A, 18B) as well, the dividing method illustrated in FIG. 14 is most preferable.

In other words, if the configuration is such that the length in the Y axis direction of each electrode portion 631 that composes the dummy electrode 63 is ¼ of the width in the Y axis direction of the touch drive electrode 61 and two electrode portions 631 positioned adjacent with the slit 632 being interposed therebetween are arranged with a shift of ¼ of the length in the Y axis direction of the electrode portion 631, the dividing lines are unnoticeable, and the touch detection electrodes 62 are unnoticeable, too. Besides, in the case of this configuration, the output signal Vout does not decrease, and the touch detection error does not impair, either, as compared with the configuration in which the dummy electrode 63 does not protrude to an adjacent touch drive electrode 61.

The embodiment described above is merely an example for implementing the present invention. The present invention is not limited to the embodiments described above, and the present invention can be implemented with various appropriate modifications made to the above-described embodiments without departing from the spirit and scope of the claims.

For example, in the above-described embodiment, the dividing line for the electrode portions 631 of the dummy electrode 63 is a line obtained by extending a linear portion of either one of the first direction linear portion 632a and the second direction linear portion 632b of the slit 632 in the zigzag shape, but the dividing line does not have to be the line obtained by extending the first direction linear portion 632a or the second direction linear portion 632b of the slit 632. For example, a line parallel to a linear portion of either one of the first direction linear portion 632a and the second direction linear portion 632b composing the slit 632 may be the dividing line, or alternatively, a line parallel to the direction in which the touch drive electrode 61 extends may be the dividing line. Further, a line at a predetermined angle (for example, an angle of 30°) with respect to a line parallel to the direction in which the touch drive electrodes 61 extend can be the dividing line.

Examples of division of the dummy electrode 63 are illustrated in FIGS. 12 to 15, but these are merely examples. In other words, the scope of the touch panel of the present embodiment encompasses any configurations as long as the configuration includes: an insulating substrate; a plurality of touch drive electrodes arranged on the insulating substrate so as to be arrayed in a first direction, each of the touch drive electrodes extending in a second direction that intersects with the first direction; a plurality of touch detection electrodes arranged on the insulating substrate so as to be arrayed in the second direction, each of the touch detection electrodes extending in the first direction; and a dummy electrode that is arranged between adjacent ones of the touch detection electrodes, in which a slit extending in the first direction is provided, wherein portions of the dummy electrode on both side of the slit interposed therebetween are divided at positions different in the first direction The display device 10 is not limited to a liquid crystal display including a liquid crystal panel, but may be a display device including a display panel of another type, such as an organic electroluminescence (EL) display device including an organic EL panel.

The touch sensor-equipped display device in the present embodiment is used in various types of electronic devices such as mobile phones (including smartphones), notebook computers (including tablet-type notebook computers), portable information terminals (including electronic books and PDAs), digital photoframes, and portable game machines.

DESCRIPTION OF REFERENCE NUMERALS

10: display device
61: touch drive electrode
62: touch detection electrode
63: dummy electrode
631: electrode portion
632: slit

The invention claimed is:
1. A touch panel comprising:
an insulating substrate;
a plurality of touch drive electrodes arranged on the insulating substrate so as to be arrayed in a first direction, each of the plurality of touch drive electrodes extending in a second direction that intersects with the first direction;

a plurality of touch detection electrodes arranged on the insulating substrate so as to be arrayed in the second direction, each of the plurality of touch detection electrodes extending in the first direction; and a dummy electrode that is arranged between adjacent ones of the plurality of touch detection electrodes, in which a slit extending substantially in the first direction is provided, wherein the dummy electrode is segmented by the slit into a plurality of electrode portions arrayed in the second direction, two adjacent ones of the plurality of electrode portions with the slit being interposed therebetween are divided at positions different in the first direction, and a protrusion ratio, as a ratio at which the dummy electrode at least partially overlapping with one of the plurality of touch drive electrodes protrudes to and overlaps with a touch drive electrode of the plurality of touch drive electrodes adjacent thereto, is 10% or less, when viewed in a direction vertical to the insulating substrate.

2. The touch panel according to claim 1,
wherein each electrode portion of the plurality of electrode portions is divided into pieces that have a length smaller than a width in the first direction of each touch drive electrode of the plurality of touch drive electrodes.

3. The touch panel according to claim 1,
wherein each piece of each electrode portion of the plurality of electrode portions, obtained by dividing the each electrode portion of the plurality of electrode portions, has a length of ¼ of a width in the first direction of each touch drive electrode of the plurality of touch drive electrodes, and two electrode portions of the plurality of electrode portions adjacent to each other with the slit being interposed therebetween are arranged so as to be shifted from each other by ¼ of a length in the first direction of each electrode portion of the plurality of electrode portions.

4. The touch panel according to claim 1,
wherein the slit is repeatedly bent in a zigzag shape, while, as an entire slit, extending in the first direction, and each electrode portion of the plurality of electrode portions is divided by, as a dividing line, a line parallel with either one of a first linear portion and a second linear portion that compose the slit in the zigzag shape.

5. The touch panel according to claim 1,
wherein an end of the dummy electrode is in a taper shape.

6. A display device comprising the touch panel according to claim 1.

7. The display device according to claim 6, wherein
the display device includes a liquid crystal display in which a liquid crystal layer is interposed between the insulating substrate and a counter substrate,
the plurality of touch drive electrodes is arranged between the insulating substrate and the counter substrate, and
the plurality of touch detection electrodes is arranged on one of surfaces of the insulating substrate, the surface being on a side opposite to a surface of the insulating substrate on which the plurality of touch drive electrodes is arranged.

8. A touch panel comprising:
an insulating substrate;

a plurality of touch drive electrodes arranged on the insulating substrate so as to be arrayed in a first direction, each of the plurality of touch drive electrodes extending in a second direction that intersects with the first direction;

a plurality of touch detection electrodes arranged on the insulating substrate so as to be arrayed in the second direction, each of the plurality of touch detection electrodes extending in the first direction; and a dummy electrode that is arranged between adjacent ones of the plurality of touch detection electrodes, in which a slit extending substantially in the first direction is provided, wherein the dummy electrode is segmented by the slit into a plurality of electrode portions arrayed in the second direction, two adjacent ones of the plurality of electrode portions with the slit being interposed therebetween are divided at positions different in the first direction, and each piece of each electrode portion of the plurality of electrode portions, obtained by dividing the each electrode portion of the plurality of electrode portions, has a length of ¼ of a width in the first direction of each touch drive electrode of the plurality of touch drive electrodes, and two electrode portions of the plurality of electrode portions adjacent to each other with the slit being interposed therebetween are arranged so as to be shifted from each other by ¼ of a length in the first direction of each electrode portion of the plurality of electrode portions.

9. The touch panel according to claim 8, wherein each piece of each electrode portion of the plurality of electrode portions has a length smaller than a width in the first direction of each touch drive electrode of the plurality of touch drive electrodes.

10. The touch panel according to claim 8,
wherein the slit is repeatedly bent in a zigzag shape, while, as an entire slit, extending in the first direction, and each electrode portion of the plurality of electrode portions is divided by, as a dividing line, a line parallel with either one of a first linear portion and a second linear portion that compose the slit in the zigzag shape.

11. The touch panel according to claim 8,
wherein an end of the dummy electrode is in a taper shape.

12. A display device comprising the touch panel according to claim 8.

13. The display device according to claim 12, wherein
the display device includes a liquid crystal display in which a liquid crystal layer is interposed between the insulating substrate and a counter substrate,
the plurality of touch drive electrodes is arranged between the insulating substrate and the counter substrate, and
the plurality of touch detection electrodes is arranged on one of surfaces of the insulating substrate, the surface being on a side opposite to a surface of the insulating substrate on which the plurality of touch drive electrodes is arranged.

* * * * *